Dec. 27, 1938. E. F. WHITE Re. 20,958

ADJUSTABLE GUN CHOKE

Original Filed Dec. 20, 1935

INVENTOR
Ezekiel Field White by
Harry P. Williams
Atty.

Reissued Dec. 27, 1938

Re. 20,958

UNITED STATES PATENT OFFICE 20,958

ADJUSTABLE GUN CHOKE

Ezekiel Field White, West Hartford, Conn.

Original No. 2,102,931, dated December 21, 1937, Serial No. 55,395, December 20, 1935. Application for reissue October 29, 1938, Serial No. 237,781

7 Claims. (Cl. 42—79)

This invention relates to adjustable means for choking the ends of shot gun barrels, of the type set forth in Patent #1,892,522 granted to me December 27, 1932.

The object of the present invention is to provide an adjustable choke of the character mentioned which will produce a more accurate and uniform shot pattern, that it, will have greater efficiency at the several adjustments of the choke, than the chokes as previously constructed.

In the prior chokes the yielding segments which are contracted from cylindrical relation to conical relation when adjustments are made for increasing the choke, were engaged at their outer ends only by a tapering surface in the adjusting sleeve and practically all the bend of the segments concentrated at the inner ends of the separating slots. With such a design when the segments were contracted there was no backing for the segments between their outer and inner ends, and as a consequence of this the segments could yield between their ends and the choke taper become more or less distorted under the pressure generated on the firing of the gun, which was a factor that effected the shot pattern. The improved design of the instant conception contemplates provision for eliminating possibility of distortion of the choke taper and for retaining the choke taper in the most efficient shape at all adjustments which may be made.

In the drawing

Fig. 1 shows a central longitudinal section of the muzzle end of a gun barrel and a choke which embodies this invention attached thereto.

Fig. 2, on larger scale and more or less diagrammatically, illustrates the relation of one of the choke shell segments and the adjacent wall of the choke adjusting sleeve, when the segment is in cylindrical relation to the axis of the bore of the gun.

Figure 1:
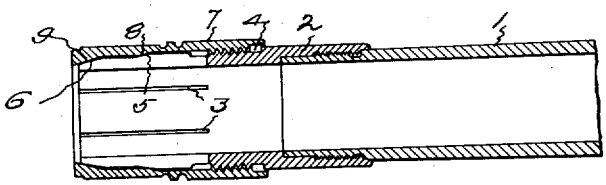

In the embodiment of the invention illustrated the muzzle end of the gun barrel 1 is externally threaded and on this is firmly screwed a forwardly extending shell 2 the interior of which forms a continuation of the gun bore. The forward end of this shell is separated into a number of segments by means of slots 3. There may be any number of slots, preferably six, and they extend parallel with the axis of the shell from the forward end to a solid cylindrical section that is externally threaded. A circumferential groove 4 is cut around the shell at the inner ends of the slots to facilitate bending, without danger of fracture, of the segments at their roots. The forward sections of the segments are reduced in thickness by cutting or grinding their exterior surfaces so as to leave annular inclines or tapering shoulders 5 about midway of the length of the segments, and the forward ends of the segments are externally beveled as at 6. The angle, with relation to the axis of the shell, of the beveled ends preferably is somewhat greater than the angle of the tapering shoulders around the middle of the segments. A single inclined shoulder is illustrated but there may be a plurality of such intermediate shoulders on each segment if desired. While this shell is shown as detachably secured to the end of the gun barrel, it could, if desired, be made integral with the barrel.

A choke adjusting sleeve 7 fits over the projecting end of the shell with its rear end in threaded engagement with the thread on the exterior of the solid cylindrical section of the shell. In the interior wall of the sleeve substantially midway of its length is a tapering shoulder 8. This shoulder under various adjustments of the sleeve is adapted to engage with the intermediate shoulders on the exterior of the shell segments, and the angle of this shoulder in the sleeve is preferably somewhat greater than the angle of the shoulders on the exteriors of the shell segments. The opening in the forward or outer end of the adjusting sleeve is contracted and internally beveled, as at 9, for engagement with the externally beveled outer ends of the segments, and the angle of this end bevel of the adjusting sleeve is preferably somewhat greater than the angle of the beveled ends of the segments.

Figure 4:
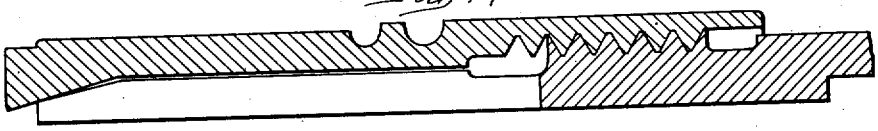
Fig. 4 shows the relation of a segment and adjacent sleeve wall of the prior choke when the segment is in cylindrical position.
Figure 5:
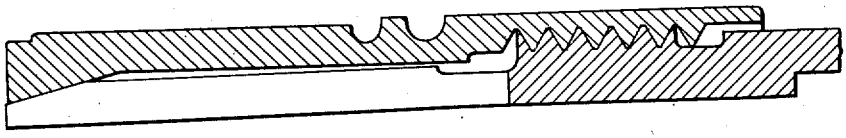
Fig. 5 shows the choke segment of the prior form contracted to conical position as when the sleeve is adjusted to provide for full choke.

It will be observed from an inspection of Fig. 4 that with the prior form of choke when the segments are in opened or cylindrical relation their outer surfaces engage with and conform to the inner wall of the adjusting sleeve, and when the adjusting sleeve is turned on to the shell the bevel end of the sleeve engages the beveled ends of the segments and causes the segments to contract by bending at their inner ends, as set forth in my prior patent referred to. Under this condition space is opened between the outer surfaces of the segments and the inner wall of the adjusting sleeve, as illustrated in Fig. 5, and there is nothing to prevent the segments from convexing outward under the pressure of the gases when the gun is fired.

Figure 2:
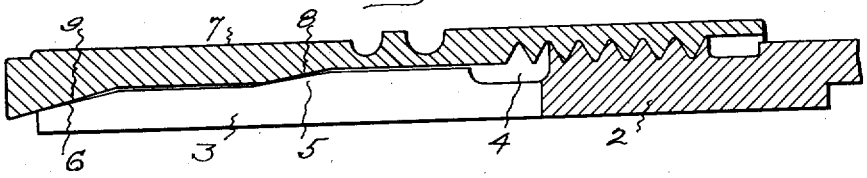
Figure 3:
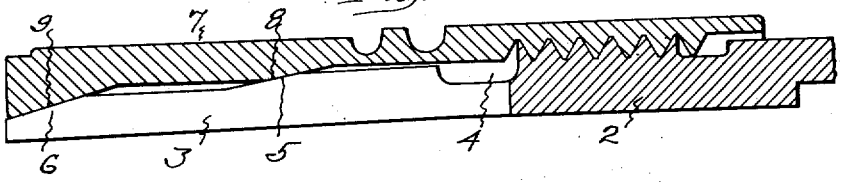
Fig. 3 is a similar view illustrating the relation of the segment and the adjacent wall of the sleeve with the segment contracted to full choke position.

With the improved construction, as indicated in Fig. 2, the segments are fully backed against expansion by the inner wall of the adjusting sleeve when the segments are in cylindrical relation, and as shown in Fig. 3, when the sleeve is turned to contract the segments to full choke position the segments are not only backed at their outer ends but they are also prevented from expanding by the engagement of the intermediate shoulders. With the improved construction the angles of the engaging shoulders of the segments and the adjusting sleeve are such that no matter what the choke adjustment is the segments are rigidly held in the desired conical relation. The adjusting sleeve may be turned different degrees to obtain the desired choke, preferably one turn adjusting the choke segments from full open bore to full choke, after the manner disclosed in my prior patent.

The invention claimed is:—

1. An adjustable choke for gun barrels which comprises a cylindrical shell having its forward portion divided longitudinally into separate segments, said segments having a plurality of spaced tapering shoulders extending transversely across their outer faces, and a sleeve adjustably connected to and movable longitudinally of the axis of said shell, said sleeve having a plurality of spaced internal angular tapering shoulders adapted to constantly engage said tapering shoulders on the segments for contracting said segments from parallel relation to the axis of the shell to angular relation to the axis of the shell and preventing the segments from flexing, under the impact of the charge as the gun is fired, when they are contracted from cylindrical relation.

2. An adjustable choke for gun barrels which comprises a cylindrical shell having its forward portion divided longitudinally into separate segments, and a sleeve adjustably connected to and movable longitudinally of the axis of said shell, the exterior faces of said segments and the interior face of said sleeve having at intervals shoulders that incline at different angles with respect to each other and are adapted to be engaged for contracting said segments from parallel relation to the axis of the shell to angular relation to the axis of the shell.

3. An adjustable choke for gun barrels which comprises a cylindrical shell having its forward portion divided into separate segments, said segments having beveled front ends and tapering shoulders on their outer faces between the ends of the segments, the angle of bevel of said front ends, with relation to the axis of the shell, being greater than the angle of taper of said shoulders, and a sleeve adjustably connected to and movable longitudinally of the axis of said shell, said sleeve having internal shoulders adapted to engage said beveled ends and tapering segment shoulders for contracting said segments from parallel relation to the axis of the shell to angular relation to the axis of the shell.

4. An adjustable choke for gun barrels which comprises a cylindrical shell having its forward portion divided into separate segments, said segments having beveled front ends and tapering shoulders on their outer faces between the ends of the segments, and a sleeve threaded upon said shell, said sleeve having an interiorly beveled end adapted to engage the beveled segment ends and having an internal tapering shoulder adapted to engage the tapering segment shoulders, the angle of bevel in the end of the sleeve, with relation to the axis of the sleeve, being greater than the angle of taper of the shoulder in the sleeve.

5. An adjustable choke for gun barrels which comprises a cylindrical shell having its forward portion divided into separate segments, said segments having beveled front ends and tapering shoulders on their outer faces between the ends of the segments, the angle of bevel of said front ends, with relation to the axis of the shell, being greater than the angle of taper of said shoulders, and a sleeve adjustably connected to and movable longitudinally of the axis of said shell, said sleeve having an interiorly beveled end adapted to engage the segment ends, and having an internal tapering shoulder adapted to engage the tapering segment shoulders, the angle of bevel in the end of the sleeve, with relation to the axis of the sleeve, being greater than the angle of taper of the shoulder in the sleeve.

6. An adjustable choke for gun barrels which comprises a cylindrical shell having its forward portion divided longitudinally into yielding segments, said segments having spaced tapering shoulders on their outer faces, and a sleeve rotatable on said shell and movable longitudinally of the axis thereof, said sleeve having annularly arranged internal projections spaced from each other and adapted constantly to engage the ends of the segments and also constantly to engage said tapering shoulders on the faces of the segments for contracting said segments from parallel relation to the axis of the shell to angular relation to the axis of the shell.

7. An adjustable choke for gun barrels which comprises a cylindrical shell having its forward portion divided longitudinally into yielding segments, said segments having spaced inclined shoulders of different angles with respect to each other on their outer faces, and a sleeve threaded upon said shell, said sleeve having in its interior spaced inclined shoulders of different angles with respect to each other adapted to constantly engage said segment shoulders for contracting said segments out of parallel relation to the axis of the shell.

EZEKIEL FIELD WHITE.